April 12, 1966 H. C. OLIJ ETAL 3,245,862
PROCESSES AND APPARATUSES FOR COATING UNDER TEMPORARY
HEATING AND PRESSURE OF FOIL MATERIAL
WITH THERMOPLASTIC PLASTIC FOIL
Filed Aug. 15, 1962
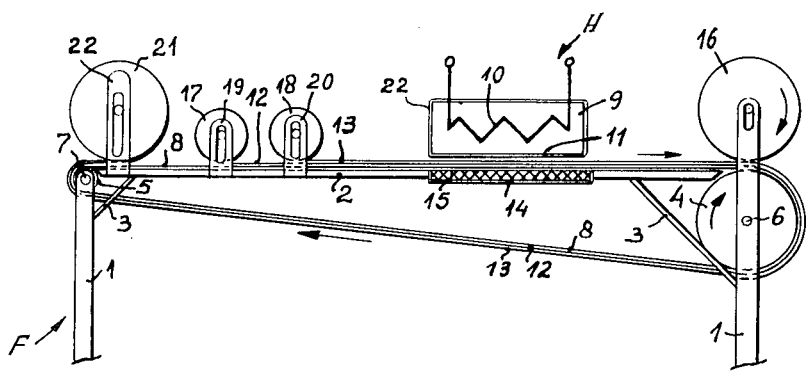

United States Patent Office 3,245,862
Patented Apr. 12, 1966

3,245,862
PROCESSES AND APPARATUSES FOR COATING UNDER TEMPORARY HEATING AND PRESSURE OF FOIL MATERIAL WITH THERMOPLASTIC PLASTIC FOIL
Hermanus Cornelis Olij, Ceramplein 36, and Michel Anton Engers, 2e Jan van der Heydenstraat 109, both of Amsterdam, Netherlands
Filed Aug. 15, 1962, Ser. No. 217,157
4 Claims. (Cl. 156—555)

The invention relates to a process of and apparatus for coating under temporary heat and pressure conditions a web of stable foil material with thermoplastic plastic foil, and more particularly to moving such webs in superposed relationship on an endless band into cooperative association with a heated surface for softening the plastic and pressing one web against the other, as well as the product produced thereby.

Such technique is known, but with the known process the foils to be connected or coated are transported through a press between two bands and which operation occurs intermittently. Immediately following such operation, the laminated material is cooled in the press. Thus, each time a part of the web is coated in the heated press, the part is moved a distance equal to the processed part, after which a new part is coated and the immediately preceding coated part is cooled under a cooled press portion. The above is necessary to prevent adhesion of the thermoplastic material to the outside of the bands. However, the same is cumbersome and it is impossible to coat the web evenly throughout its width and length dimensions since during treatment, joints will appear along the edges of the press platens and such is agumented as one part of the press is heated and an adjacent part is cooled.

An important object is to overcome the above and other objectionable characteristics existing in the art.

According to the invention the above and other objects are achieved by moving the two types of foils to be connected or coated together via a single conveyor band continuously at a predetermined speed past a heating surface with the face of the band in contact with the thermoplastic foil being non-adherent to such foil.

By virtue of the invention, the time period during which the temperature can act on the foils can be lengthened so that the temperature of the heated surface can be selected relatively low and a light over temperature will generally suffice for effecting with certainty a desirable equal, uniform softening of the thermoplastic foil throughout the full depth and an excellent distribution and adhesion to the foil to be coated. In addition, by reason of the low temperature, materials having a singe or scorch temperature lying only slightly above the desired heating temperature of the thermoplastic foil can be coated with excellent results with such plastic foils. Furthermore, fine gauze fabric or similar material can be coated with thermoplastic foil which can be sufficiently thin that when fluid, it passes through the fabric and/or penetrates the material thereof for rendering the fabric liquid-tight and liquid resistant.

The invention can also be employed with good results for applying thermoplastic foil to rough fabrics such as jute.

As mentioned, the temperature of the heated surface is preferably selected equal to or slightly higher than the required temperature for the desired fluidity of the thermoplastic material. The desired fluidity is further realized by the selection of the dimensions of the heated surface in the path of movement of the foils and proper adjustment of the speed of movement of the foils relative to the heated surface. The relatively low temperature possesses the advantage that a gradual, uniform and equal softening of the thermoplastic foil occurs thereby resulting in a product of very high quality.

Certain materials to be coated, such as fabrics cut on the bias or tubular fabrics wherein the weft and warp threads extend on the bias respecting the longitudinal direction of the fabric, are sensitive to forces acting in their planes so that no pulling forces may be exerted thereon. Moreover, this type of material can be coated with plastic with favorable results by the present concept by moving the foils on a movable band past the heated surface, and the pulling forces are imparted to the band. The band provides an outer covering at the area of heat application and effects insulation against heat loss which is most desirable for softening of the thermosplastic.

Another favorable aspect is that the foils are resiliently evenly pressed against the heated surface whereby an equal heat transmission on the plastic foil is achieved during movement of the foils and, if necessary, the foils can be subjected to the action of separate pressing means following passage past the heated surface.

It is to be understood that the invention can be used in connection with sheets or strips in lieu of webs.

Further objects and advantages of the invention will become more readily apparent to a person skilled in the art from the following detailed description and attached drawing which is a diagrammatic view of an apparatus embodying the invention.

Referring to the drawing, there is shown a framework denoted generally F, including vertical standards or the like 1, a horizontal table top 2 and braces or supports 3 for fixedly mounting the top 2 relative to the standards. Rolls 4 and 5 are located at opposite ends of the table top 2 and are rotatably journalled about axes 6 and 7, respectively. It will be noted that the diameter of the roll 4 is greater than that of the roll 5 and the peripheries of the respective rolls are contiguous with the upper surface of the table top 2.

In the embodiment illustrated, the roll 4 is the driving roll which can be driven by suitable means such as an electro-motor (not shown) via a stepless, adjustable reduction gear means (not shown) so that the speed of the roll 4 and as a consequence that of the foils to be processed can be adjusted very accurately.

An endless band 8, preferably of ramie covered and/or partly impregnated with Teflon or silicone plastic and which substances do not adhere easily to other materials and more particularly polyethylene or polyvinyl chloride is trained over the rolls 4 and 5 with the upper flight of the band moving over the table top 2. A more durable endless band can be fabricated from glass fabric or very thin metal.

A heating means H is located above the band 8 and extends the full transverse dimension of the top 2, preferably in proximity to the driving roll 4. The heating means includes a substantially rectangular closed vessel 9 containing a liquid, such as oil, and which liquid can be heated by means of a heating coil 10. The vessel 9 is provided with a flat bottom wall 1 which serves as a heating surface and the temperature of the liquid in the vessel can be controlled by means of a thermostatic regulating unit (not illustrated). In addition, the height of the vessel 9 relative to the table top 2 can be adjusted within fine limits by conveninet adjusting means.

It will be noted that the table top 2 is provided with a recess 14 beneath the vessel 9 and a cushion 15 of elastic material such as felt is located within the recess 14. As will be readily apparent, foil webs 12 and 13 to be coated will be pressed evenly against the heating surface 11 of the vessel 9 throughout the entire length thereof together with the endless band 8 by virtue of the cushion.

A pressing roll 16 is mounted above the driving roll 4 and such roll is mounted in the standards 1 for movement toward and away from the roll 4. In other words, the roll 16 can press with an adjustable pressure on the webs 12 and 13 after the same leave the heating means.

The webs 12 and 13 are withdrawn from supply rolls 17 and 18 journalled in slotted arms 19 and 20 mounted on the table top 2 in advance of the heating means H. Hence, the supply rolls 17 and 18 rest on the band 8 and the webs 12 and 13 are unreeled from the rolls without strain and are moved simultaneously in superposed relationship beneath the heating surface 11 and between the rolls 16 and 4. The webs then travel with the band 8 about the driving roll 4 and thence about the roll 5. After passing the roll 5, the webs are wound on roll 21 rotatably carried in slotted arms 22 supported by the top 2 forwardly of the rolls 17 and 18. It will be appreciated that the roll 21 is driven by the band so that the webs are wound on the roll without strain.

In practice it has been found expedient for the web 12 to be the plastic foil which may be polyethylene or polyvinyl chloride with the web 13 being of stable material. It will be seen that the web 12 is located between the web 13 and the band 8 but in view of the nature of the band as previously described, plastic cannot adhere to the band when softened by the heating means. Obviously, for other plastic materials, it may be necessary to treat the band with suitable substances to prevent adhesion between these components.

In the event the web 13 contains finishing materials which may come out during the heating step and adhere to the bottom surface ultimately forming a crust thereon, another band 22 is arranged about the heating means H and is adapted to be moved by the webs and band 8. This means the materials will be deposited on the band 22 rather than the surface 11 and this band can be cleaned or replaced if necessary.

It is also within the scope of the invention to interchange the webs 12 and 13. In other words, the web 13 could be carried by the roll 17 and web 12 by roll 18 so that web 13 would be arranged between the band 8 and the web 12. In such an arrangement, the band 22 would be necessary to prevent the softened plastic material from adhering to the heated surface 11.

If desirable, the roll 16 may be insulated against contamination or adhesion of the softened plastic. The roll 21 may be located behind the rolls 4 and 16 since it is merely necessary to maintain enough distance between these rolls to allow the plastic coated material to cool sufficiently. In the illustrated embodiment, such a result is achieved without additional space requirements in the plant, and two or more machines can be controlled by a single operator.

Under certain conditions, the band 8 may be omitted and this is dependent on the shape of the heated surface 11, which may be cylindrical, convex or concave in lieu of plane. If such surface is concave, the band may be replaced by a roll for guiding the material but it is to be understood that the band can be used in such situations provided the guide surface at the back of the band is of an appropriate configuration.

The invention may be used with all types of fabrics, including organic fibrous material, plastics, as well as metal foil. Moreover, two or more webs arranged alternately one above the other can be coated and secured together.

The invention is not to be confined to any strict conformity to the showing in the drawing, but changes or modifications may be made therein so long as such changes or modifications mark no material departure from the spirit and scope of the appended claims.

We claim:

1. An apparatus for coating stable material with thermoplastic material under temporary heat and pressure conditions, comprising a frame having a supporting surface, an endless band having at least its outer face nonadherent to thermoplastic material when soft rotatably supported by the frame with the upper flight thereof being movable along said supporting surface, means for imparting movement to said endless band, means on the frame for supporting and supplying a web of thermoplastic material to said band, second means on the frame behind said first means in the direction of movement of the band for supporting and supplying a web of stable material onto the web of thermoplastic material, stationarily mounted heating means located above the endless band extending at least the full transverse dimension of the band and having a heated surface facing the web of stable material, and stationary cushion means of resilient material on the supporting surface below said heating means for resiliently urging said band and webs upwardly thereby pressing the web of stable material against the heated surface for softening the thermoplastic material and uniting the webs.

2. The coating apparatus as claimed in claim 1, in which said cushion means is positioned in a recess in the supporting surface having dimensions complementary to the dimensions of the heating means.

3. The coating apparatus as claimed in claim 2, further including additional means operably associated with the endless band behind the heating means in the direction of movement of the bands for applying pressure to the webs.

4. The coating apparatus as claimed in claim 3, further including an endless band passing about the heated surface of the heating means between such surface and the web of stable material.

References Cited by the Examiner

UNITED STATES PATENTS

| | | | |
|---|---|---|---|
| 1,361,970 | 12/1920 | Dickey | 156—311 |
| 2,288,054 | 6/1942 | Walton | 156—78 |
| 2,511,703 | 6/1950 | Ettl | 156—311 X |
| 2,537,126 | 1/1951 | Francis | 156—306 X |
| 2,614,953 | 10/1952 | Anglada | 156—306 |
| 2,657,157 | 10/1953 | Francis | 161—143 |
| 2,702,580 | 2/1955 | Bateman | 156—247 |
| 2,782,458 | 2/1957 | Emmert et al. | 156—313 X |
| 2,906,847 | 9/1959 | Grevich | 156—555 X |
| 2,957,793 | 10/1960 | Dickey | 156—324 X |
| 3,032,459 | 5/1962 | Uhleen | 156—311 X |
| 3,086,904 | 4/1963 | Uhleen | 156—324 X |
| 3,093,525 | 6/1963 | Wilson et al. | 156—79 |

FOREIGN PATENTS

| | | |
|---|---|---|
| 1,102,595 | 3/1961 | Germany. |
| 644,858 | 10/1950 | Great Britain. |
| 865,832 | 4/1961 | Great Britain. |

EARL M. BERGERT, *Primary Examiner.*